United States Patent
Li (10) Patent No.: US 11,963,086 B2
(45) Date of Patent: Apr. 16, 2024

(54) METHOD AND APPARATUS FOR ACCESS CONTROL BARRING

(71) Applicant: BEIJING XIAOMI MOBILE SOFTWARE CO., LTD., Beijing (CN)

(72) Inventor: Yanhua Li, Beijing (CN)

(73) Assignee: BEIJING XIAOMI MOBILE SOFTWARE CO., LTD., Beijing (CN)

(*) Notice: Subject to any disclaimer, the term of this patent is extended or adjusted under 35 U.S.C. 154(b) by 525 days.

(21) Appl. No.: 17/278,654

(22) PCT Filed: Sep. 21, 2018

(86) PCT No.: PCT/CN2018/107051
§ 371 (c)(1),
(2) Date: Mar. 22, 2021

(87) PCT Pub. No.: WO2020/056741
PCT Pub. Date: Mar. 26, 2020

(65) Prior Publication Data
US 2022/0038996 A1    Feb. 3, 2022

(51) Int. Cl.
*H04W 56/00* (2009.01)
*H04W 48/06* (2009.01)
*H04W 76/27* (2018.01)
*H04W 76/38* (2018.01)

(52) U.S. Cl.
CPC ......... *H04W 48/06* (2013.01); *H04W 76/27* (2018.02); *H04W 76/38* (2018.02)

(58) Field of Classification Search
CPC ...... H04W 48/06; H04W 76/38; H04W 76/27
USPC ........................................... 370/329
See application file for complete search history.

(56) References Cited

U.S. PATENT DOCUMENTS

| 7,730,201 B1* | 6/2010 | McAllister | H04L 12/5602 709/239 |
| 2013/0201823 A1 | 8/2013 | Gupta | |
| 2018/0070278 A1 | 3/2018 | Uemura et al. | |
| 2019/0007991 A1 | 1/2019 | Chang | |
| 2020/0084818 A1* | 3/2020 | Xu | H04W 76/18 |

FOREIGN PATENT DOCUMENTS

| CN | 1568049 A | 1/2005 |
| CN | 102137433 A | 7/2011 |
| CN | 102469514 A | 5/2012 |

(Continued)

OTHER PUBLICATIONS

"CN 110351872, Zhang, Access Control Method And User Equipment, Oct. 18, 2019" (Year: 2019).*

(Continued)

*Primary Examiner* — Sai Ming Chan
(74) *Attorney, Agent, or Firm* — Arch & Lake LLP (57) ABSTRACT

Methods and apparatuses are provided for access control barring. The method is applied to a terminal in a connected state or an inactive state. The method includes: starting a designated timer for access control barring; receiving a Radio Resource Control (RRC) connection release message sent by a base station when the designated timer has not reached a designated stop time; and determining based on the RRC connection release message that an Access Stratum (AS) of the terminal remains in a congested state.

20 Claims, 8 Drawing Sheets

(56) References Cited

FOREIGN PATENT DOCUMENTS

| CN | 102469555 A | 5/2012 |
|---|---|---|
| CN | 106954270 A | 7/2017 |
| CN | 107343299 A | 11/2017 |
| CN | 107431964 A | 12/2017 |
| WO | 2013113159 A1 | 8/2013 |

OTHER PUBLICATIONS

"CN 1039755543, Kim, A Method And Device Of Receiving A Multimedia Broadcast Multicast Service In Mobile Communication System, Aug. 6, 2014" (Year: 2014).*

International Search Report issued in PCT Application No. PCT/CN2018/107051, dated Jun. 19, 2019, (4p).

First Office Action and Search Report Issued in Chinese Application No. 201880001885.3 dated Aug. 3, 2020 with English translation (16p).

Intel Corporation,"5G access control mechanism in Connected", 3GPP TSG RAN WG2 Meeting #101, R2-1802940, Revision of R2-1800923, Athens, Greece, Feb. 26-Mar. 2, 2018, (5p).

3rd Generation Partnership Project;Technical Specification Group Radio Access Network;Evolved Universal Terrestrial Radio Access (E-UTRA);Radio Resource Control (RRC);Protocol specification(Release 16), 3GPP TS 36.331 V16.3.0, Dec. 2020, (1084p).

3rd Generation Partnership Project; Technical Specification Group Core Network and Terminals; Non-Access-Stratum (NAS) protocol for Evolved Packet System (EPS); Stage 3 (Release 17); 3GPP TS 24.301 V17.1.0 (Dec. 2020), (586p).

* cited by examiner

METHOD AND APPARATUS FOR ACCESS CONTROL BARRING

CROSS REFERENCE

The present application is the U.S. National Phase of International Application Ser. No. PCT/CN2018/107051 filed on Sep. 21, 2018, which is incorporated herein by reference in its entirety for all purposes.

TECHNICAL FIELD

The present disclosure relates to the technical field of telecommunication, and in particular, to a method and an apparatus for access control barring.

BACKGROUND

In a LTE (Long Term Evolution) telecommunication system, the working mechanism of AC (Access Control) barring is obtaining a corresponding AC barring parameter based on an access class of a terminal and a call type of a call initiated by the terminal, and performing AC barring check.

For a NR (New Radio) communication system, a unified AC barring mechanism is introduced. Moreover, the unified AC barring mechanism can be used for a terminal in an idle state or in an inactive state, and can also be used for a terminal in a connected state.

In the related art, the AC barring in the LTE communication system or the NR communication system is closely related to a T30x timer or a T302 timer. Moreover, in the LTE communication system, when the T30x timer or T302 timer is running, some types of services cannot be initiated on a NAS (Non Access Stratum, non-access stratum) of the terminal. After the T30x timer or T302 timer has expired, an AS (Access Stratum) of the terminal needs to notify the NAS that the congestion is relieved. Then, the NAS of the terminal can continue to initiate service request attempts. That is to say, the T30x timer or the T302 timer cannot run after the RRC (Radio Resource Control) connection is successfully established, that is, the T30x timer or the T302 timer cannot work in the connected state.

However, for the NR communication system, it is desired that the T30x timer or T302 timer are able to work in the connected state, and there is no optimization solution for the T30x timer or T302 timer running in the connected state.

SUMMARY

In order to alleviate the problem existing in the related art, examples of the present disclosure provide a method and an apparatus for access control barring.

According to a first aspect of the present disclosure, a method for access control barring is provided, the method is applied to a terminal in a connected state or an inactive state. The method includes:

starting a designated timer for access control barring;
receiving a Radio Resource Control (RRC) connection release message sent by a base station when the designated timer has not reached a designated stop time; and
determining based on the RRC connection release message that an Access Stratum (AS) of the terminal remains in a congested state.

According to a second aspect of the present disclosure, an apparatus for access control barring is provided, the apparatus is applied to a terminal in a connected state or an inactive state. The apparatus includes:

a starting module configured to start a designated timer for access control barring;
a receiving module configured to receive a Radio Resource Control (RRC) connection release message sent by a base station when the designated timer has not reached a designated stop time; and
a determining module configured to determine based on the RRC connection release message that an Access Stratum (AS) of the terminal remains in a congested state.

According to a third aspect of the present disclosure, a non-transitory computer-readable storage medium is provided, the non-transitory computer-readable storage medium has a computer program stored thereon, and the computer program is used to execute the method for access control barring provided in the first aspect.

According to a fourth aspect of the present disclosure, an apparatus for access control barring is provided, the apparatus is configured in a terminal in a connected state or an inactive state, and the apparatus includes:

a processor; and
a memory for storing instructions executable by the processor,
wherein the processor is configured to:
start a designated timer for access control barring;
receive a Radio Resource Control (RRC) connection release message sent by a base station when the designated timer has not reached a designated stop time; and
determine based on the RRC connection release message that an Access Stratum (AS) of the terminal remains in a congested state.

It is to be understood that the above general descriptions and the below detailed descriptions are merely exemplary and explanatory, and are not intended to limit the present disclosure.

BRIEF DESCRIPTION OF THE DRAWINGS

The accompanying drawings, which are incorporated in and constitute a part of this specification, illustrate examples consistent with the present disclosure and, together with the description, serve to explain the principles of the disclosure.

DETAILED DESCRIPTION OF THE EMBODIMENTS

Examples will be described in detail herein, with the illustrations thereof represented in the drawings. When the following descriptions involve the drawings, like numerals in different drawings refer to like or similar elements unless otherwise indicated. The embodiments described in the following examples do not represent all embodiments consistent with the present disclosure. Rather, they are merely examples of apparatuses and methods consistent with some aspects of the present disclosure as detailed in the appended claims.

The terms used in the present disclosure are for the purpose of describing particular examples only, and are not intended to limit the present disclosure. Terms determined by "a", "the" and "said" in their singular forms in the present disclosure and the appended claims are also intended to include plurality, unless clearly indicated otherwise in the context. It should also be understood that the term "and/or" as used herein is and includes any and all possible combinations of one or more of the associated listed items.

It is to be understood that, although terms "first," "second," "third," and the like may be used in the present disclosure to describe various information, such information should not be limited to these terms. These terms are only used to distinguish one category of information from another. For example, without departing from the scope of the present disclosure, first information may be referred as second information; and similarly, second information may also be referred as first information. Depending on the context, the word "if" as used herein may be interpreted as "when" or "upon" or "in response to determining".

Figure 1:
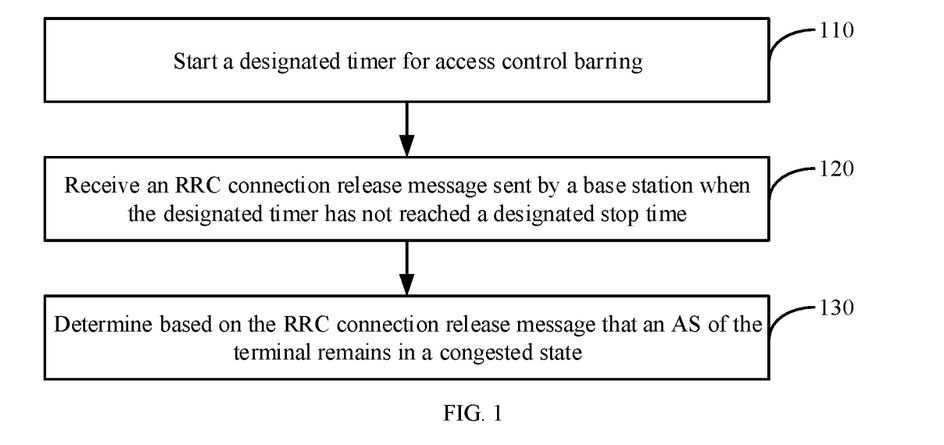
FIG. 1 is a flowchart illustrating a method for access control barring according to an example.
Figure 2:
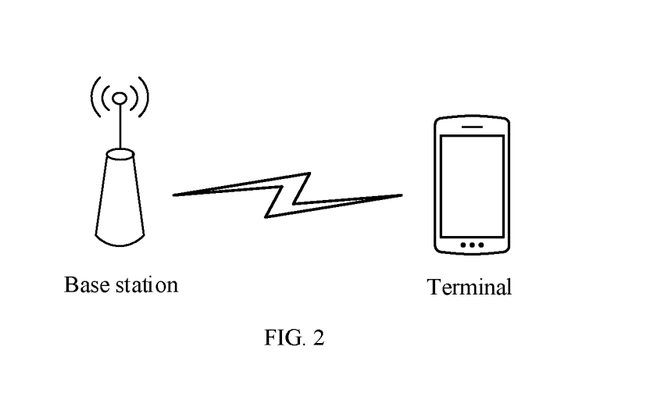
FIG. 2 illustrates an application scenario diagram for a method for access control barring according to an example.

FIG. 1 is a flowchart illustrating a method for access control barring according to an example, and FIG. 2 is an application scenario diagram for a method for access control barring according to an example. The method for access control barring can be applied to a terminal in a connected state or an inactive state. As shown in FIG. 1, the method for access control barring can include the following steps 110-130.

At step 110, a designated timer for access control barring is started.

In the example of the present disclosure, the designated timer in the AC barring mechanism can refer to a timer that bars the terminal from continuing to initiate a call. In addition, there are many types of designated timers. Some timers can be started by the terminal autonomically; some timers can be started by the terminal according to the configuration of the base station.

In an example, the designated timer at step 110 can include a first timer or a second timer. The first timer is configured to represent a timer that is started upon the terminal failing to initiate an access attempt. The second timer is configured to represent a timer carried in an RRC connection rejection message received after the terminal initiates an RRC connection request.

The first timer can be a T30x timer. The T30x timer is an AC barring timer started upon failing of an access attempt initiated by the terminal, and the T30x timer corresponds to an access category. That is to say, there is a T30x timer corresponding to each access category. For example, if there are 64 access categories, there will be 64 T30x timers.

The second timer can be a T302 timer. The T302 timer is a timer (waitTime) carried in an RRC Connection Reject (RRCConnectionReject) message received after the terminal initiates an RRC connection request. After the terminal starts the T302 timer carried in the RRC connection rejection message sent by the base station, many services cannot be initiated by the terminal during the operation of the T302 timer.

At step 120, when the designated timer has not reached a designated stop time, an RRC connection release message sent by a base station is received.

At step 130, it is determined based on the RRC connection release message that an AS of the terminal remains in a congested state.

In the example of the present disclosure, after the terminal receives an RRC connection release message sent by the base station, the terminal does not immediately notify the NAS of the terminal that the congestion state of the AS of the terminal has been relieved; instead, it determines that the AS of the terminal remains in the congested state. The NAS of the terminal can then be notified that the AS of the terminal remains in the congested state.

The application scenario shown in FIG. 2 includes a terminal and a base station. After the terminal starts a designated timer for access control barring (for example, T30x timer or T302 timer), if the terminal receives a connection release message sent by the base station, instead of immediately notifying the NAS of the terminal that the congestion has been relieved, the terminal determines based on the RRC connection release message that the AS of the terminal remains congested. That is to say, even if the RRC connection release message sent by the base station is received, an access initiated by the terminal will be barred within a certain period of time.

It can be seen from the above example that after the designated timer for access control barring is started, if a connection release message sent by the base station is received when the designated timer has not reached the designated stop time, based on the RRC connection release message, it can be determined that the AS of the terminal remains in the congested state, thereby improving the barring process after the terminal receives the RRC connection release message in the AC barring mechanism, and also improving the reliability of access control barring.

Figure 3:
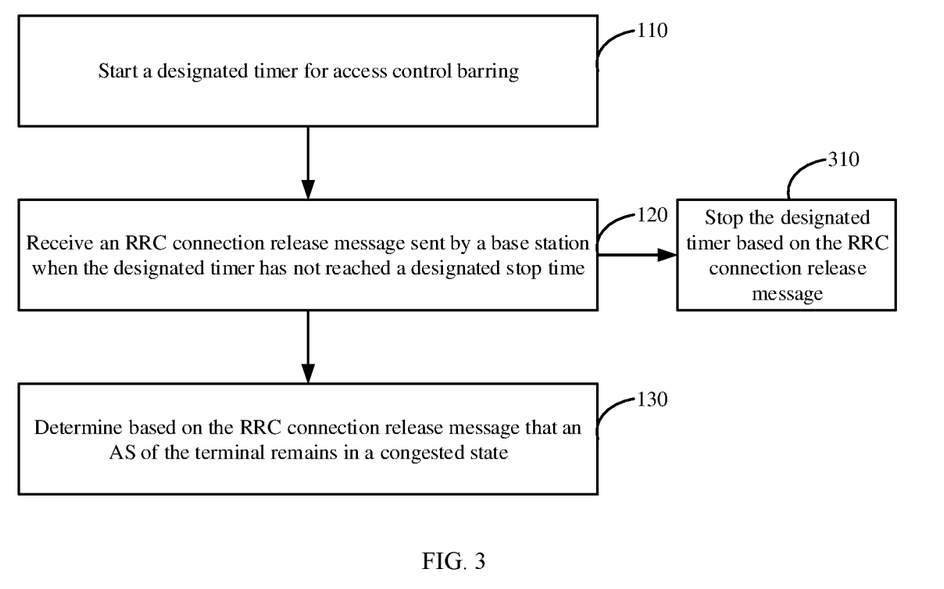
FIG. 3 is a flowchart illustrating another method for access control barring according to an example.

FIG. 3 is a flowchart illustrating another method for access control barring according to an example. The method for access control barring can be applied to a terminal in a connected state or an inactive state, and based on the method shown in FIG. 1, after step 120 is performed, as shown in FIG. 3, the following step 310 can also be included.

At step 310, the designated timer is stopped based on the RRC connection release message.

In the example of the present disclosure, after the terminal receives the RRC connection release message sent by the base station, if the designated timer has not reached the designated stop time, the designated timer can be stopped in advance. The designated timer can be a T30x timer or a T302 timer.

In addition, step 310 and step 130 of the method shown in FIG. 1 can be performed at the same time; step 130 can also be performed before step 310; step 310 can also be performed before step 130.

It can be seen from the above example that upon receiving an RRC connection release message sent by the base station, based on the RRC connection release message, the terminal may stop the designated timer, and determine that the AS of the terminal remains in the congested state instead of notifying the NAS of the terminal of the congestion relief, thereby improving the accuracy of access control barring.

Figure 4:
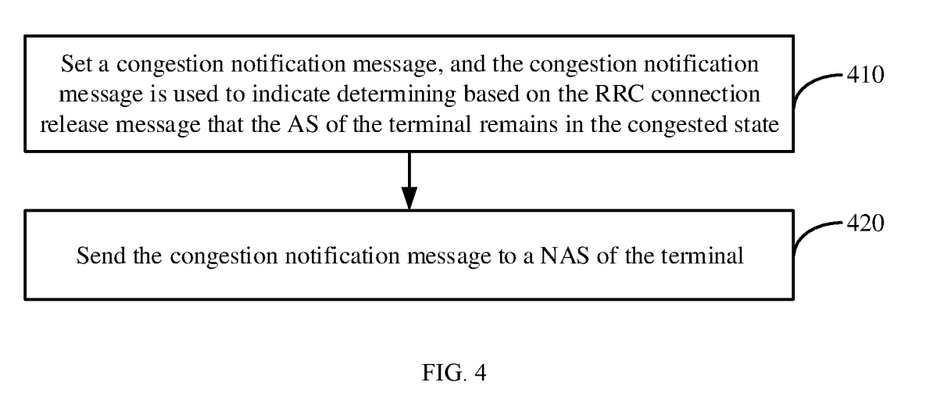
FIG. 4 is a flowchart illustrating another method for access control barring according to an example.

FIG. 4 is a flowchart illustrating another method for access control barring according to an example. The method for access control barring can be applied to a terminal in a connected state or an inactive state, and based on the method shown in FIG. 1 or FIG. 3, after step 130 is performed, as shown in FIG. 4, the following steps 410-420 can be included.

At step 410, a congestion notification message is set, and the congestion notification message is used to indicate determining based on the RRC connection release message that the AS of the terminal remains in the congested state.

In the example of the present disclosure, when the terminal receives an RRC connection release message, it can inform the NAS of the terminal through a congestion notification message that the AS of the terminal remains in the congested state.

At step 420, the congestion notification message is sent to the NAS of the terminal.

In the example of the present disclosure, the congestion notification message may be sent by the AS of the terminal to the NAS of the terminal.

It can be seen from the above example that when determining to notify the NAS of the terminal, a congestion notification message can be set first, where the congestion notification message is used to indicate determining based on the RRC connection release message that the AS of the terminal remains in the congested state, and then the congestion notification message is sent to the NAS of the terminal. Thus, even if the terminal receives the RRC connection release message, the NAS of the terminal will learn from the congestion notification message that the AS of the terminal remains in a congested state, thus ensuring the consistency of access control barring between different stratums of the terminal.

Figure 5:
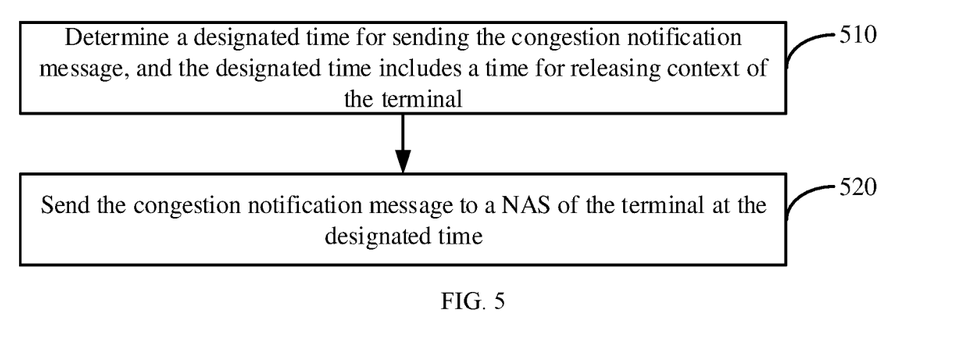
FIG. 5 is a flowchart illustrating another method for access control barring according to an example.

FIG. 5 is a flowchart illustrating another method for access control barring according to an example. The method for access control barring can be applied to a terminal in a connected state or an inactive state, and based on the method shown in FIG. 4, when step 420 is performed, as shown in FIG. 5, the following steps 510-520 can also be included.

At step 510, a designated time for sending the congestion notification message is determined, and the designated time includes a time for releasing context of the terminal.

At step 520, the congestion notification message is sent to the NAS of the terminal at the designated time.

In the example of the present disclosure, the congestion notification message can be sent by the AS of the terminal to the NAS of the terminal at the designated time. In addition, the congestion notification message can also carry other related information besides indicating determining that the AS of the terminal remains in the congested state based on the RRC connection release message.

For example: if the designated timer that is started is the T30x timer and the start of the T30x timer is triggered by a NAS event, the AS of the terminal can notify the NAS of the terminal through a congestion notification message of a first duration for further barring. For the specific process, reference can be made to the example shown in FIG. 6.

For another example, if the designated timer that is started is the T302 timer, the AS of the terminal can notify the NAS of the terminal through a congestion notification message of a second duration for further barring. For the specific process, reference can be made to the example shown in FIG. 7.

It can be seen from the above example that when sending a congestion notification message, a designated time for sending the congestion notification message can be first determined, where the designated time includes a time to release the context of the terminal, and then the congestion notification message is sent to the NAS of the terminal at the designated time, thereby improving the efficiency of sending the congestion notification message.

Figure 6:
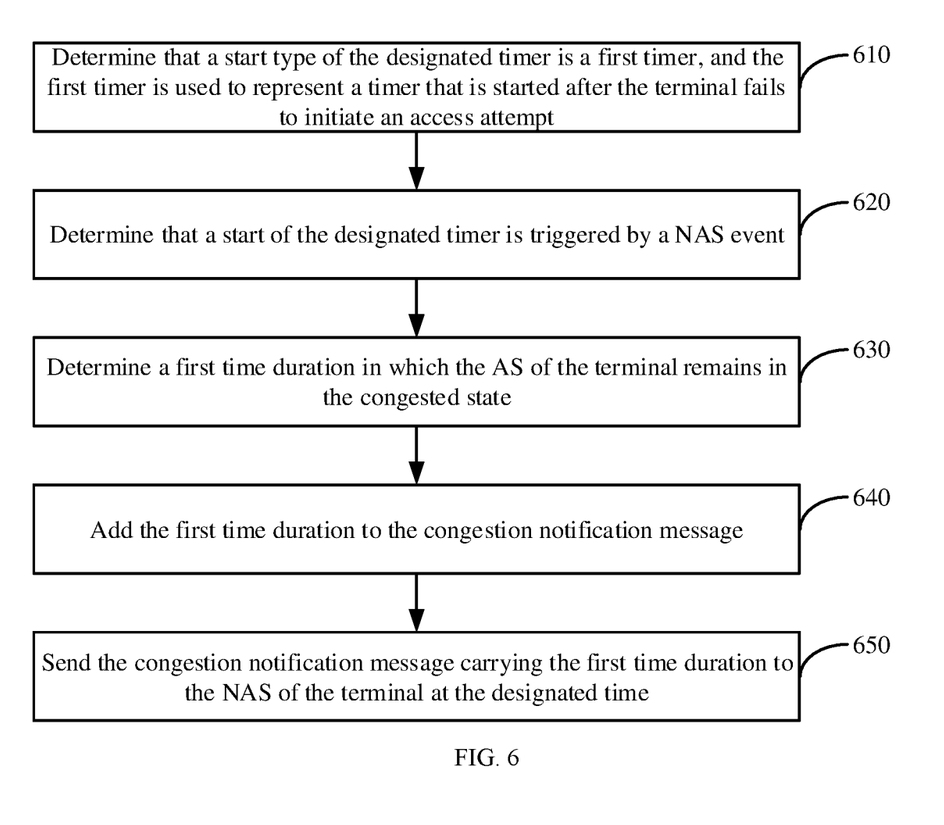
FIG. 6 is a flowchart illustrating another method for access control barring according to an example.

FIG. 6 is a flowchart illustrating another method for access control barring according to an example. The method for access control barring can be applied to a terminal in a connected state or an inactive state, and based on the method shown in FIG. 5, when step 520 is performed, as shown in FIG. 6, the following steps 610-650 can also be included.

At step 610, it is determined that a start type of the designated timer is a first timer, and the first timer is used to represent a timer that is started after the terminal fails to initiate an access attempt, such as a T30x timer.

At step 620, it is determined that a start of the designated timer is triggered by a NAS event.

At step 630, a first duration in which the AS of the terminal remains in the congested state is determined.

In the example of the present disclosure, the first duration can be a time value determined by the terminal based on an actual request.

In an example, the first duration can be a total duration of the first timer, or a remaining duration of the first timer when the first timer is stopped based on the RRC connection release message.

For example, if the total duration of the first timer is 5 seconds, the first duration can be 5 seconds.

For another example, if the total duration of the first timer is 5 seconds, and it has been started for 2 seconds and the remaining duration when it is stopped is 3 seconds, the first duration can be 3 seconds.

At step 640, the first duration is added to the congestion notification message.

At step 650, the congestion notification message carrying the first duration is sent to the NAS of the terminal at a designated time.

It can be seen from the above example that if the designated timer that is started is the first timer, and the start of the designated timer is triggered by a NAS event, a first duration for further barring can be notified to the NAS of the terminal through a congestion notification message, thereby improving the accuracy of access control barring.

Figure 7:
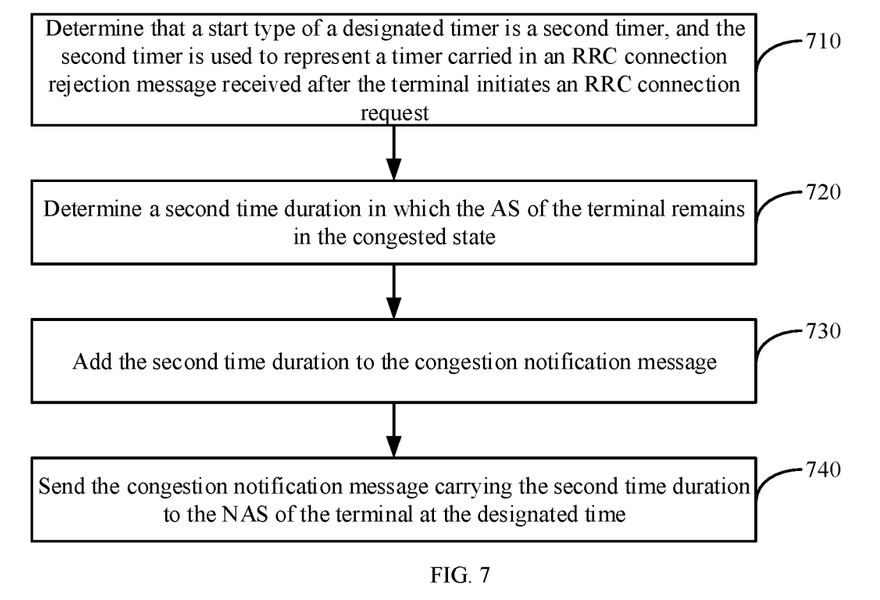
FIG. 7 is a flowchart illustrating another method for access control barring according to an example.

FIG. 7 is a flowchart illustrating another method for access control barring according to an example. The method for access control barring can be applied to a terminal in a connected state or an inactive state, and based on the method shown in FIG. 5, when step 520 is performed, as shown in FIG. 7, the following steps 710-740 can also be included.

At step 710, it is determined that the start type of a designated timer is a second timer, and the second timer is used to represent a timer carried in an RRC connection rejection message received after the terminal initiates an RRC connection request, such as a T302 timer.

At step 720, a second duration in which the AS of the terminal remains in the congested state is determined.

In the example of the present disclosure, the second duration can be a time value determined by the terminal based on an actual request.

In an example, the second duration can be a total duration of the second timer, or a remaining duration of the second timer when it is stopped based on the RRC connection release message.

For example, if the total duration of the second timer is 8 seconds, the second duration can be 8 seconds.

For another example, if the total duration of the second timer is 8 seconds, and it has been started for 3 seconds and the remaining duration when it is stopped is 5 seconds, the second duration can be 5 seconds.

At step 730, the second duration is added to the congestion notification message.

At step 740, the congestion notification message carrying the second duration is sent to the NAS of the terminal at a designated time.

In an example, when step 740 is performed, in addition to the second duration, the congestion notification message can also carry a designated service type barred by the second timer. The specific process includes the following steps:

(1-1) determining a designated service type barred by the second timer;

(1-2) adding the designated service type to the congestion notification message;

(1-3) sending the congestion notification message carrying the second duration and the designated service type to the NAS of the terminal at the designated time.

In an example, the designated service type in step (1-1) can include at least one of:

(2-1) a designated access category;

(2-2) a designated access identity.

The designated access type can refer to an attribute of the initiated service, such as voice or video. The access identity can refer to an attribute of a user who initiates the service, such as a high-priority user or a low-priority user.

In an example, the designated service type in step (1-1) can be designated based on a communication protocol or written on the terminal in the form of firmware.

It can be seen from the above example that if the designated timer that is started is the second timer, a second duration for further barring, in particular, the second duration and the designated service type, can be notified to the NAS of the terminal through a congestion notification message, thereby improving the reliability of access control barring.

Corresponding to the above examples of the method for access control barring, the present disclosure also provides examples of an apparatus for access control barring.

Figure 8:
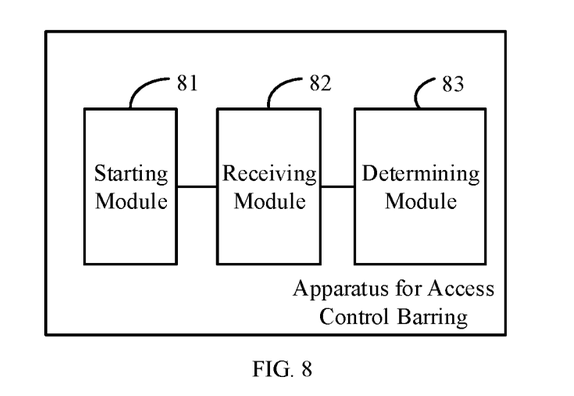
FIG. 8 is a block diagram illustrating an apparatus for access control barring according to an example.

FIG. 8 is a block diagram illustrating an apparatus for access control barring according to an example. The apparatus can be applied to a terminal in a connected state or an inactive state, and configured to perform the method for access control barring shown in FIG. 1. As shown in FIG. 8, the apparatus for access control barring can include:

a starting module 81 configured to start a designated timer for access control barring;

a receiving module 82 configured to receive a Radio Resource Control (RRC) connection release message sent by a base station when the designated timer has not reached a designated stop time;

a determining module 83 configured to determine based on the RRC connection release message that an Access Stratum (AS) of the terminal remains in a congested state.

It can be seen from the above example that after the designated timer for access control barring is started, if a connection release message sent by the base station is received when the designated timer has not reached the designated stop time, based on the RRC connection release message, it can be determined that the AS of the terminal remains in the congested state, thereby improving the barring process after the terminal receives the RRC connection release message in the AC barring mechanism, and also improving the reliability of access control barring.

Figure 9:
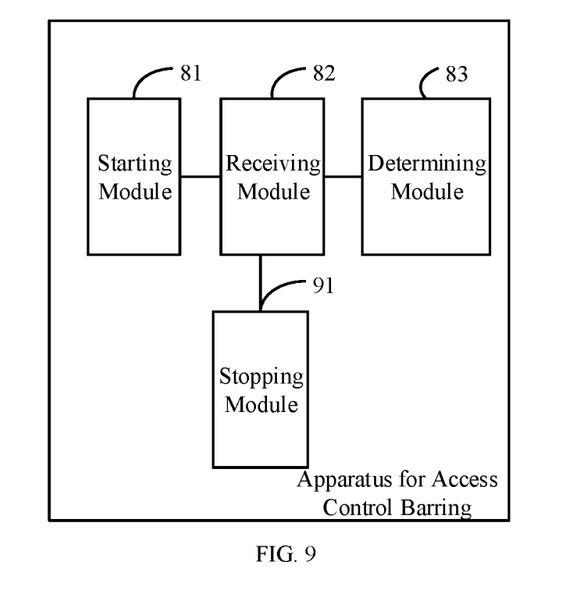
FIG. 9 is a block diagram illustrating another apparatus for access control barring according to an example.

In an example, based on the apparatus shown in FIG. 8, as shown in FIG. 9, the apparatus can further include:

a stopping module 91 configured to stop the designated timer based on the RRC connection release message upon receiving the RRC connection release message sent by the base station.

It can be seen from the above example that upon receiving an RRC connection release message sent by the base station, t based on the RRC connection release message, the terminal may stop the designated timer, and determine that the AS of the terminal remains in the congested state instead of notifying the NAS of the terminal of the congestion relief, thereby improving the accuracy of access control barring.

In an example, based on the apparatus shown in FIG. 8 or FIG. 9, the designated timer includes a first timer or a second timer, the first timer is used to represent a timer that is started after the terminal fails to initiate an access attempt, and the second timer is used to represent a timer carried in an RRC connection rejection message received after the terminal initiates an RRC connection request.

Figure 10:
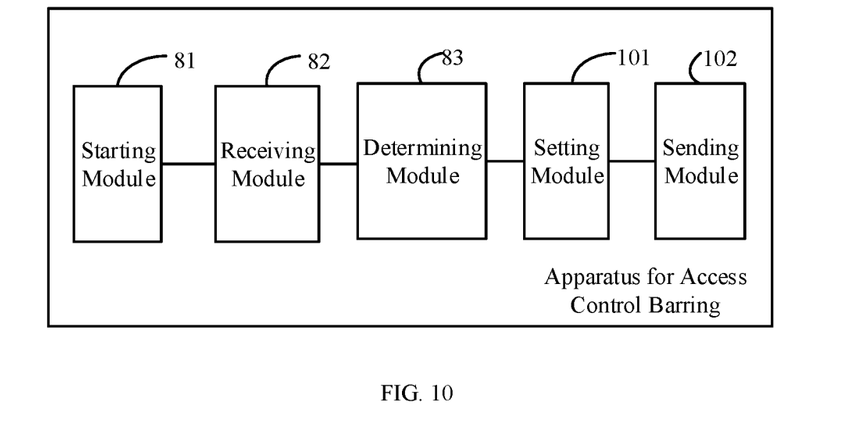
FIG. 10 is a block diagram illustrating another apparatus for access control barring according to an example.

In an example, based on the apparatus shown in FIG. 8 or FIG. 9, as shown in FIG. 10, the apparatus can further include:

a setting module 101 configured to set a congestion notification message after determining that the Access Stratum (AS) of the terminal is in a congested state based on the RRC connection release message, wherein the congestion notification message is used to indicate determining based on the RRC connection release message that the AS of the terminal remains in the congested state;

a sending module 102 configured to send the congestion notification message to a Non-Access Stratum (NAS) of the terminal.

It can be seen from the above example that when determining to notify the NAS of the terminal, a congestion notification message can be set first, where the congestion notification message is used to indicate determining based on the RRC connection release message that the AS of the terminal remains in the congested state, and then the congestion notification message is sent to the NAS of the terminal. Thus, even if the terminal receives the RRC connection release message, the NAS of the terminal will learn from the congestion notification message that the AS of the terminal remains in a congested state, thus ensuring the consistency of access control barring between different stratums of the terminal.

Figure 11:
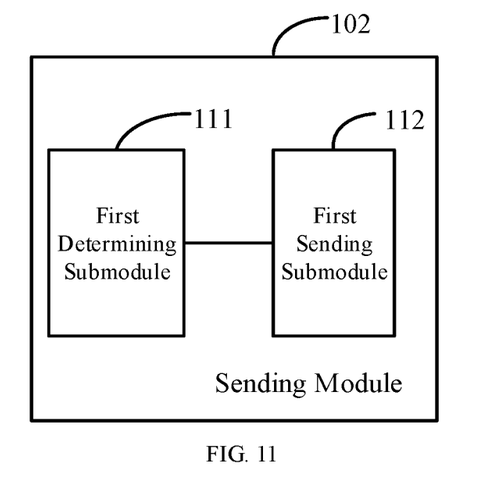
FIG. 11 is a block diagram illustrating another apparatus for access control barring according to an example.

In an example, based on the apparatus shown in FIG. 10, as shown in FIG. 11, the sending module 102 can include:

a first determining submodule 111 configured to determine a designated time for sending the congestion notification message, wherein the designated time includes a time for releasing context of the terminal;

a first sending submodule 112 configured to send the congestion notification message to the NAS of the terminal at the designated time.

It can be seen from the above example that when sending a congestion notification message, a designated time for sending the congestion notification message can be first determined, where the designated time includes a time to release the context of the terminal, and then the congestion notification message is sent to the NAS of the terminal at the designated time, thereby improving the efficiency of sending the congestion notification message.

Figure 12:
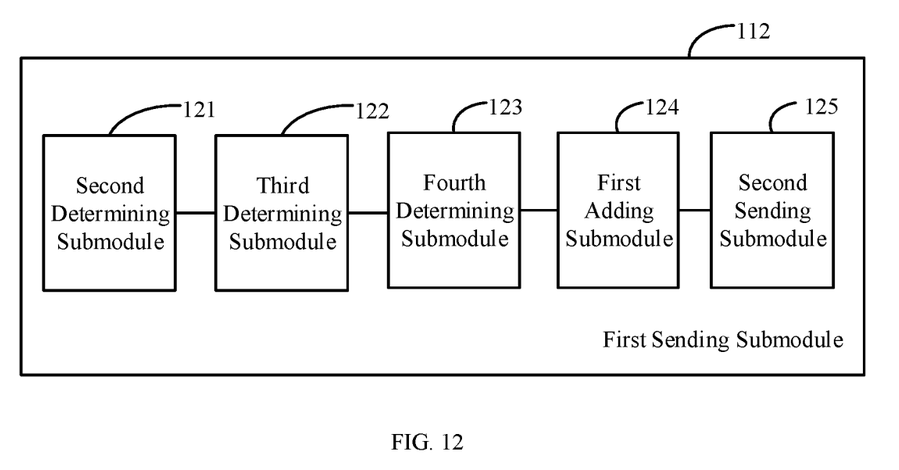
FIG. 12 is a block diagram illustrating another apparatus for access control barring according to an example.

In an example, based on the apparatus shown in FIG. 11, as shown in FIG. 12, the first sending submodule 112 can include:

a second determining submodule 121 configured to determine that a start type of the designated timer is a first timer, where the first timer is used to represent a timer that is started after the terminal fails to initiate an access attempt;

a third determining submodule 122 configured determine that the start of the designated timer is triggered by a NAS event;

a fourth determining submodule 123 configured to determine a first duration in which the AS of the terminal remains in the congested state;

a first adding submodule 124 configured to add the first duration to the congestion notification message;

a second sending submodule 125 configured to send the congestion notification message carrying the first duration to the NAS of the terminal at the designated time.

It can be seen from the above example that if the designated timer that is started is the first timer, and the start of the designated timer is triggered by a NAS event, a first duration for further barring can be notified to the NAS of the terminal through a congestion notification message, thereby improving the accuracy of access control barring.

In an example, based on the apparatus shown in FIG. 12, the first duration is the total duration of the first timer, or the remaining duration of the first timer when the first timer is stopped based on the RRC connection release message.

Figure 13:
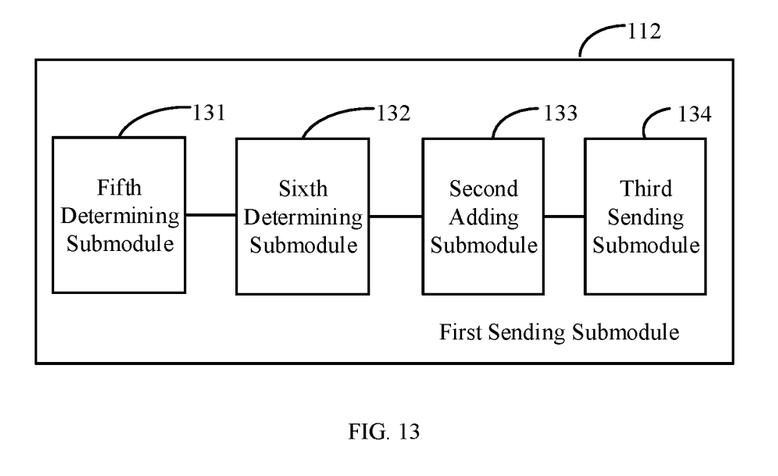
FIG. 13 is a block diagram illustrating another apparatus for access control barring according to an example.

In an example, based on the apparatus shown in FIG. 11, as shown in FIG. 13, the first sending submodule 112 includes:

a fifth determining submodule 131 configured to determine that the start type of the designated timer is a second timer, where the second timer is used to represent a timer carried in an RRC connection rejection message received after the terminal initiates an RRC connection request;

a sixth determining submodule 132 configured to determine a second duration in which the AS of the terminal remains in the congested state;

a second adding submodule 133 configured to add the second duration to the congestion notification message;

a third sending submodule 134 configured to send the congestion notification message carrying the second duration to the NAS of the terminal at the designated time.

In an example, based on the apparatus shown in FIG. 13, the second duration is the total duration of the second timer, or the remaining duration of the second timer when the second timer is stopped based on the RRC connection release message.

Figure 14:
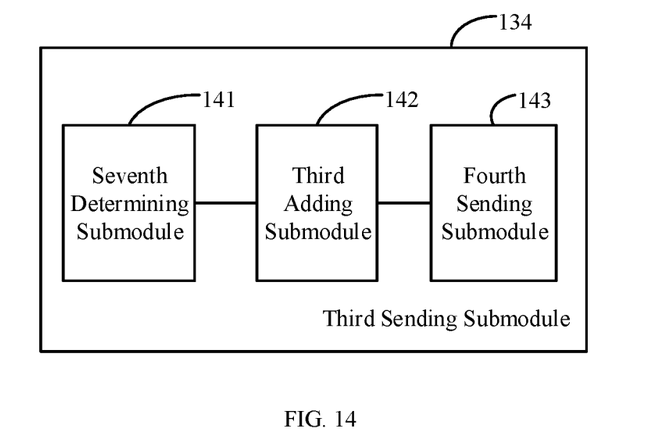
FIG. 14 is a block diagram illustrating another apparatus for access control barring according to an example.

In an example, based on the apparatus shown in FIG. 13, as shown in FIG. 14, the third sending submodule 134 can include:

a seventh determining submodule 141 configured to determine a designated service type barred by the second timer;

a third adding submodule 142 configured to add the designated service type to the congestion notification message;

a fourth sending submodule 143 configured to send the congestion notification message carrying the second duration and the designated service type to the NAS of the terminal at the designated time.

In an example, based on the apparatus shown in FIG. 14, the designated service type can include at least one of:
a designated access category;
a designated access identity.

In an example, based on the apparatus shown in FIG. 14, the designated service type is determined based on a communication protocol or written on the terminal in a form of firmware.

It can be seen from the above example that if the designated timer that is started is the second timer, a second duration for further barring, in particular, the second time duration and the designated service type, can be notified to the NAS of the terminal through a congestion notification message, thereby improving the reliability of access control barring.

Since the apparatus examples substantially correspond to the method examples, a reference can be made to part of the descriptions of the method examples for the related part. The apparatus examples described above are merely illustrative, where the units described as separate members can be or not be physically separated, and the members displayed as units can be or not be physical units, e.g., can be located in one place, or can be distributed to a plurality of network units. Part or all of the modules can be selected according to actual requirements to implement the objectives of the solutions in the examples. Those of ordinary skill in the art can understand and carry out them without creative work.

The present disclosure also provides a non-transitory computer-readable storage medium on which a computer program is stored, and the computer program is configured to perform the method for access control barring described in any one of FIGS. 1 to 7.

The present disclosure also provides an apparatus for access control barring, the apparatus is used in a terminal in a connected state or an inactive state, and the apparatus includes:

a processor; a memory for storing instructions executable by the processor;

wherein the processor is configured to:
start a designated timer for access control barring;
receive a Radio Resource Control (RRC) connection release message sent by a base station when the designated timer has not reached a designated stop time;
determine based on the RRC connection release message that an AS of the terminal remains in a congested state.

Figure 15:
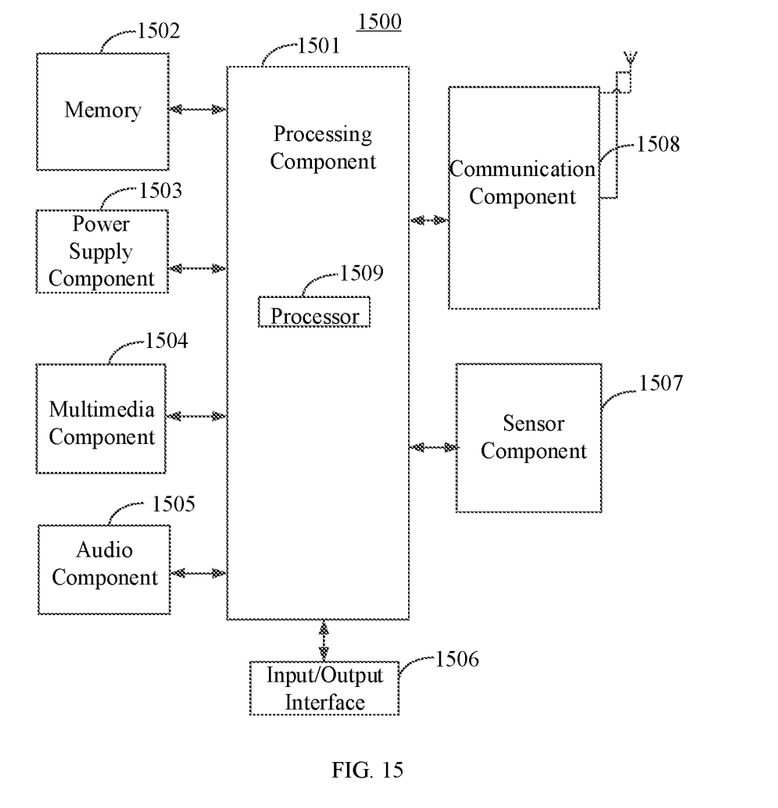
FIG. 15 is a block diagram illustrating an apparatus for access control barring according to an example.

FIG. 15 is a block diagram illustrating an apparatus for access control barring according to an example. As shown in FIG. 15, the apparatus 1500 for access control barring can be a terminal such as a computer, a mobile phone, a digital broadcasting terminal, a messaging device, a game console, a tablet device, a medical device, fitness equipment, a personal digital assistant, or the like.

As shown in FIG. 15, the apparatus 1500 can include one or more of the following components: a processing component 1501, a memory 1502, a power supply component 1503, a multimedia component 1504, an audio component 1505, an input/output (I/O) interface 1506, a sensor component 1507, and a communication component 1508.

The processing component 1501 generally controls overall operations of the apparatus 1500, such as operations associated with display, phone calls, data communications, camera operations, and recording operations. The processing component 1501 can include one or more processors 1509 to execute instructions, to complete all or part of the steps of the method. In addition, the processing component 1501 can include one or more modules which facilitate the interaction between the processing component 1501 and other components. For example, the processing component 1501 can include a multimedia module to facilitate the interaction between the multimedia component 1504 and the processing component 1501.

The memory 1502 is configured to store various types of data to support the operation of the apparatus 1500. Examples of such data include instructions for any application or method operated on the apparatus 1500, contact data, phonebook data, messages, pictures, videos, and so on. The memory 1502 can be implemented by any type of volatile or non-volatile storage devices or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic or compact disk.

The power supply component 1503 supplies power for different components of the apparatus 1500. The power supply component 1503 can include a power supply management system, one or more power supplies, and other components associated with generating, managing and distributing power for the apparatus 1500.

The multimedia component 1504 includes a screen providing an output interface between the apparatus 1500 and a user. In some examples, the screen can include a Liquid Crystal Display (LCD) screen and a Touch Panel (TP). If the screen includes the TP, the screen can be implemented as a touch screen to receive input signals from the user. The TP can include one or more touch sensors to sense touches, swipes, and gestures on the TP. The touch sensors can not only sense a boundary of a touch or swipe, but also sense duration and a pressure associated with the touch or swipe. In some examples, the multimedia component 1504 includes a front camera and/or a rear camera. When the apparatus 1500 is in an operation mode, such as a capture mode or a video mode, the front camera and/or the rear camera can receive external multimedia data. Each front camera and rear camera can be a fixed optical lens system or have focal length and optical zoom capabilities.

The audio component 1505 is configured to output and/or input an audio signal. For example, the audio component 1505 includes a microphone (MIC). When the apparatus 1500 is in an operating mode, such as a call mode, a record mode and a voice recognition mode, the microphone is to receive an external audio signal. The received audio signal can be further stored in the memory 1502 or sent via the communication component 1508. In some examples, the audio component 1505 further includes a speaker for outputting an audio signal.

The I/O interface 1506 provides an interface between the processing component 1501 and a peripheral interface module. The above peripheral interface module can be a keyboard, a click wheel, buttons, or the like. These buttons can include but are not limited to: a home button, a volume button, a start button, and a lock button.

The sensor component 1507 includes one or more sensors to provide status assessments of various aspects for the apparatus 1500. For example, the sensor component 1507 can detect the on/off status of the apparatus 1500, and relative positioning of component, for example, the component is a display screen and a keypad of the apparatus 1500. The sensor component 1507 can also detect a change in position of the apparatus 1500 or a component of the apparatus 1500, a presence or absence of the contact between a user and the apparatus 1500, an orientation or an acceleration/deceleration of the apparatus 1500, and a change in temperature of the apparatus 1500. For example, the sensor component 1507 can further include a proximity sensor configured to detect the presence of nearby objects when there is no physical contact. The sensor component 1507 can also include n optical sensor, such as a CMOS or CCD image sensor, for use in imaging applications. In some examples, the sensor component 1507 can also include an acceleration sensor, a gyroscope sensor, a magnetic sensor, a pressure sensor or a temperature sensor.

The communication component 1508 is to facilitate wired or wireless communication between the apparatus 1500 and other devices. The apparatus 1500 can access a wireless network based on a communication standard, such as Wi-Fi, 2G or 3G, or a combination thereof. In an example, the communication component 1508 receives a broadcast signal or broadcast related information from an external broadcast management system via a broadcast channel. In an example, the communication component 1508 can further include a Near Field Communication (NFC) module for promoting short-range communication. For example, the NFC module can be implemented based on a radio frequency identification (RFID) technology, an infrared data association (IrDA) technology, an ultra-wideband (UWB) technology, a Bluetooth (BT) technology and other technologies.

In an example, the apparatus 1500 can be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, microcontrollers, microprocessors, or other electronic components, in order to perform the method described above.

In an example, there is also provided a non-transitory computer readable storage medium that stores executable instructions, such as the memory 1502 storing executable instructions. The executable instructions can be executed by the processor 1509 of the apparatus 1500 to implement the above-described method. For example, the non-transitory computer readable storage medium can be a Read-Only Memory (ROM), a Random Access Memory (RAM), a CD-ROM, a magnetic tape, a floppy disk, an optical data storage device, and so on.

Wherein, when the instructions in the storage medium are executed by the processor, the apparatus 1500 is caused to perform any one of the methods for access control barring.

The technical solution provided by the examples of the present disclosure can bring about the following beneficial effects.

With the terminal in the present disclosure, after the designated timer for access control barring is started, if a connection release message sent by the base station is received when the designated timer has not reached the designated stop time, based on the RRC connection release message, it can be determined that the AS of the terminal remains in the congested state, thereby improving the barring process after the terminal receives the RRC connection release message in the AC barring mechanism, and also improving the reliability of access control barring.

It is to be understood that the present disclosure is not limited to the precise structure described above and shown in the accompanying drawings, and that various modifications and changes can be made without departing from the scope thereof. The scope of the present disclosure is limited only by the appended claims.

What is claimed is:
1. A method for access control barring, the method comprising:
    starting, by a terminal in a connected state or an inactive state, a designated timer for access control barring;

receiving, by the terminal, a Radio Resource Control (RRC) connection release message sent by a base station when the designated timer has not reached a designated stop time; and determining, by the terminal, based on the RRC connection release message that an Access Stratum (AS) of the terminal remains in a congested state.

2. The method of claim 1, wherein after receiving the RRC connection release message sent by the base station, the method further comprises:

stopping, by the terminal, the designated timer based on the RRC connection release message.

3. The method of claim 1, wherein the designated timer comprises a first timer or a second timer, the first timer is configured to represent a timer that is started after the terminal fails to initiate an access attempt, and the second timer is configured to represent a timer carried in an RRC connection rejection message received after the terminal initiates an RRC connection request.

4. The method of claim 1, wherein after determining based on the RRC connection release message that the AS of the terminal remains in the congested state, the method further comprises:

setting a congestion notification message that is configured to indicate determining based on the RRC connection release message that the AS of the terminal remains in the congested state; and sending the congestion notification message to a non-access stratum (NAS) of the terminal.

5. The method of claim 4, wherein sending the congestion notification message to the NAS of the terminal comprises:

determining a designated time for sending the congestion notification message, wherein the designated time comprises a time for releasing context of the terminal; and sending the congestion notification message to the NAS of the terminal at the designated time.

6. The method of claim 5, wherein sending the congestion notification message to the NAS of the terminal at the designated time comprises:

determining that a start type of the designated timer is a first timer, wherein the first timer is configured to represent a timer that is started after the terminal fails to initiate an access attempt;

determining that the start of the designated timer is triggered by a NAS event;

determining a first duration in which the AS of the terminal remains in the congested state;

adding the first duration to the congestion notification message; and sending the congestion notification message carrying the first duration to the NAS of the terminal at the designated time.

7. The method of claim 6, wherein the first duration is a total duration of the first timer, or a remaining duration of the first timer when the first timer is stopped based on the RRC connection release message.

8. The method of claim 5, wherein sending the congestion notification message to the NAS of the terminal at the designated time comprises:

determining that a start type of the designated timer is a second timer, wherein the second timer is configured to represent a timer carried in an RRC connection rejection message received after the terminal initiates an RRC connection request;

determining a second duration in which the AS of the terminal remains in the congested state;

adding the second duration to the congestion notification message; and sending the congestion notification message carrying the second duration to the NAS of the terminal at the designated time.

9. The method of claim 8, wherein the second duration is a total duration of the second timer, or a remaining duration of the second timer when the second timer is stopped based on the RRC connection release message.

10. The method of claim 8, wherein sending the congestion notification message carrying the second duration to the NAS of the terminal at the designated time comprises:

determining a designated service type barred by the second timer;

adding the designated service type to the congestion notification message; and sending the congestion notification message carrying the second duration and the designated service type to the NAS of the terminal at the designated time.

11. The method of claim 10, wherein the designated service type comprises at least one of:

a designated access category; or a designated access identity.

12. The method of claim 10, wherein the designated service type is determined based on a communication protocol or written on the terminal in a form of firmware.

13. An apparatus for access control barring, the apparatus is applied in a terminal in a connected state or an inactive state, and the apparatus comprising:

a processor; and a memory for storing instructions executable by the processor, wherein the processor is configured to:

start a designated timer for access control barring;

receive a Radio Resource Control (RRC) connection release message sent by a base station when the designated timer has not reached a designated stop time; and determine based on the RRC connection release message that an Access Stratum (AS) of the terminal remains in a congested state.

14. The apparatus of claim 13, wherein after receiving the RRC connection release message sent by the base station, the processor is further configured to:

stop the designated timer based on the RRC connection release message.

15. The apparatus of claim 13, wherein the designated timer comprises a first timer or a second timer, the first timer is configured to represent a timer that is started after the terminal fails to initiate an access attempt, and the second timer is configured to represent a timer carried in an RRC connection rejection message received after the terminal initiates an RRC connection request.

16. The apparatus of claim 13, wherein after determining based on the RRC connection release message that the AS of the terminal remains in the congested state, the processor is further configured to:

set a congestion notification message, wherein the congestion notification message is used to indicate determining based on the RRC connection release message that the AS of the terminal remains in the congested state; and send the congestion notification message to a non-access stratum (NAS) of the terminal.

17. The apparatus of claim 16, wherein when sending the congestion notification message to the NAS of the terminal, the processor is configured to:

determine a designated time for sending the congestion notification message, wherein the designated time comprises a time for releasing context of the terminal; and send the congestion notification message to the NAS of the terminal at the designated time.

18. The apparatus of claim 17, wherein when sending the congestion notification message to the NAS of the terminal at the designated time, the processor is configured to:

determine that a start type of the designated timer is a first timer, wherein the first timer is configured to represent a timer that is started after the terminal fails to initiate an access attempt;

determine that the start of the designated timer is triggered by a NAS event;

determine a first duration in which the AS of the terminal remains in the congested state;

add the first duration to the congestion notification message; and send the congestion notification message carrying the first duration to the NAS of the terminal at the designated time.

19. The apparatus of claim 18, wherein the first duration is a total duration of the first timer, or a remaining duration of the first timer when the first timer is stopped based on the RRC connection release message.

20. The apparatus of claim 17, wherein when sending the congestion notification message to the NAS of the terminal at the designated time, the processor is configured to:

determine that a start type of the designated timer is a second timer, wherein the second timer is configured to represent a timer carried in an RRC connection rejection message received after the terminal initiates an RRC connection request;

determine a second duration in which the AS of the terminal remains in the congested state;

add the second duration to the congestion notification message; and send the congestion notification message carrying the second duration to the NAS of the terminal at the designated time.

* * * * *